2,958,665
NON-IONIC SURFACE-ACTIVE GEL COMPOSITIONS AND PREPARATION THEREOF

Andrew Stefcik, Easton, and John Wayne Burnard, East Bangor, Pa., assignors to General Aniline & Film Corporation, New York, N.Y., a corporation of Delaware No Drawing. Filed July 24, 1957, Ser. No. 673,772

12 Claims. (Cl. 252—316)

This invention relates to non-ionic surfactant gel compositions having new and diversified commercial applications.

It has been recognized by the art that particular care is required in the selection of a thickening agent for a variety of reasons among which are solubility and thickening or gelling power in relation to the liquid to be thickened. There have been many cases where the amount of a certain thickening agent in a certain liquid was limited by solubility at any reasonable elevated temperature. Other cases include situations where the thickening agent failed to thicken or gel properly due to agglomeration and precipitation upon cooling of the solution.

Usually a normally liquid non-ionic surfactant can be thickened or gelled by the addition of water, a compound such as for example soap, carboxy methyl cellulose, and the like, which dilutes the non-ionic surfactant and hence its surface activity. The principal shortcoming of such gel compositions is that it cannot be liquefied for certain uses such as spotting agents or dry cleaning aids. In other words, such gel or thickening compositions are not thixotropic in nature and hence have not attained commercial acceptance.

To provide a concentrated and an improved non-ionic surfactant gel composition which is thixotropic in nature and can be liquefied by simply mixing or rubbing slightly constitutes the principal object of the present invention.

Other objects and new and useful features of the invention will become more clearly manifest from the following description.

The above and other objects of the present invention are accomplished by mixing any commercially available liquid non-ionic surfactant with at least one N-substituted-γ-hydroxy carboxylic acid amide having the following general formula:

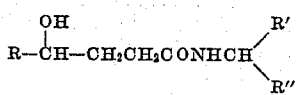

wherein R represents either hydrogen or a methyl group, R' represents an organic radical, devoid of water solubilizing groups such as sulfonic or carboxylic acid groups, containing from 10 to 30 carbon atoms, e.g. decyl, undecyl, undecylenyl, hendecyl, dodecyl, tridecyl, tetradecyl, cetyl, myristolenyl, pentadecyl, heptadecyl, hexadecyl, hexadecenyl, octadecyl, octadecenyl, octadecadienyl, abietinyl, dehydroabietinyl, dihydroabietinyl, oleyl, elaidyl, erucyl, monylbenzyl, octylbenzyl, diamylbenzyl, dioctylbenzyl, etc., and mixtures of such radicals and R" represents either hydrogen or an alkyl group of from 1 to 18 carbon atoms, e.g. methyl, propyl, butyl, amyl, hexyl, nonyl, decyl, dodecyl, cetyl, octadecyl, etc., the total number of carbon atoms constituting the groups in both R' and R" being a minimum of 10 and not more than 48 carbon atoms.

The gelling or thickening compounds utilized in accordance with the present invention are obtained by the reaction of one mole of an aliphatic N-primary amine or mixtures of such amines containing from 10 to 40 carbon atoms with one mole of either γ-butyrolactone or γ-valerolactone at a temperature of 80–95° C. as disclosed in application Ser. No. 625,224, filed on November 30, 1956. The complete disclosure which is incorporated herein by reference to the various compounds per se which are useful as thixotropic and thickening agents and to the method of preparing the same. The (concentrated) gelled non-ionics of the present invention find use in many applications, the most important of which is in the squeeze tube application. They are packaged in this convenient form as laundry spotting agents, as dry cleaning aids, wetting, foaming and emulsifying agents for many industrial as well as consumer uses.

As illustrative examples of the thixotropic and thickening agents characterized by the foregoing formula, the following may be mentioned:

(1) HO—$CH_2$—$CH_2$—$CH_2$—$CONHCH_2(CH_2)_8CH_3$

The reaction product of N-decylamine and γ-butyrolactone (2)
$$CH_3-\underset{\underset{OH}{|}}{CH}-CH_2-CH_2CONHCH_2(CH_2)_8CH_3$$

The reaction product of N-decylamine and γ-valerolactone (3) HO—$CH_2$—$CH_2$—$CH_2CONHCH_2(CH_2)_{10}CH_3$ The reaction product of N-dodecylamine and γ-butyrolactone (4) HO—$CH_2$—$CH_2$—$CH_2CONHCH_2(CH_2)_{14}CH_3$ The reaction product of N-cetylamine and γ-butyrolactone (5) HO—$CH_2$—$CH_2$—$CH_2CONHCH_2(CH_2)_{16}CH_3$ The reaction product of octadecylamine and γ-butyrolactone (6) The reaction product of 1 mole (86.1 grams) of γ-butyrolactone with 1 mole (274 grams) of a commercially available mixture of amine having the following composition: hexadecylamine 10%, octadecylamine 10%, octadecenylamine 35%, octadecadienylamine 45%.

(7) The reaction product of 1 mole (86.1 grams) of γ-butyrolactone and 1 mole (365 grams) of a commercially available mixture of amines (derived from tall oil) and having the following composition: octadecenylamine 15%, octadecadienylamine 15%, abietylamine 70%.

(8) The reaction product of 1 mole (86.1 grams) of γ-butyrolactone and 1 mole (276 grams) of a commercially available mixture of amines having the following composition: hexadecylamine 6%, octadecylamine 93%, octadecenylamine 1%.

(9) The reaction product of 1 mole (86.1 grams) of γ-butyrolactone and 1 mole (317 grams) of a commercially available primary amine made from a modified rosin (dehydroabietylamine) having the following formula:

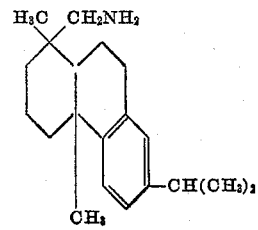

(10) The reaction product of 1 mole (100.0 grams) of γ-valerolactone and 1 mole (365 grams) of a commercially available mixture of amines having the following composition: octadecenylamine 15%, octadecadienylamine 15%, abietylamine 70%.

(11) The reaction product of 0.2 mole (7.2 grams) of γ-butyrolactone with 0.2 mole (58.9 grams) of the monoamide prepared from coconut oil and ethylenediamine in the usual manner.

(12) The reaction product of 1 mole (86.1 grams) of γ-butyrolactone with 0.2 mole (65.3 grams) of stearamidoethyl amine.

(13) The reaction product of 0.5 mole (43 grams) of γ-butyrolactone with 0.48 mole (320 grams) of polymerized fatty acid octaethylene amine. The latter is available on the market under the brand name of Empol 1022 and is derived from essentially a $C_{36}$ dibasic acid resulting from the polymerization of naturally occurring unsaturated $C_{18}$ fatty acids. The typical properties are as follows:

| | |
|---|---|
| Molecular weight approx. | 600 |
| Acid value, mg. KOH/g. min | 180 |
| Saponification value, mg. KOH/g. min | 185 |
| Neutralization equivalent | 289–304 |
| Dimer content percent | 75 |
| Trimer content do | 22 |
| Monomer content do | 3 |
| Sp. gr. 15.5° C. | 0.95 |
| Viscosity at 25° C. centistokes | 10,000 |

(14) The reaction product of 1 mole of γ-butyrolactone with 1 mole of a commercially available mixture of amines having the following composition: octylamine 8%, decylamine 9%, dodecylamine 47%, tetradecylamine 18%, hexadecylamine 8%, octadecylamine 5% and octadecenylamine 5%.

All of the products of the foregoing illustrations are smooth semi-solid masses.

The thickening or gelling agents utilized in accordance with the present invention are employed in any liquid non-ionic surfactant, preferably polyoxyethylenated active hydrogen compounds obtained by treatment of alkylene oxides with aliphatic or aromatic alcohols, phenols, amides, mercaptans, amines, long-chain fatty acids and the like. The nature or character of the liquid non-ionic surfactant is immaterial so long as it is liquid at normal temperatures and wherein the ratio of the oxyalkylene groups per mole of active hydrogen compound is between 5 and 20:1. The non-ionic liquid surfactants of this character may be illustrated by the following general formula:

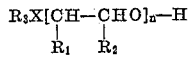

wherein $R_3$ represents an alkyl radical containing from 8 to 27 carbon atoms, e.g. octyl, nonyl, decyl, dodecyl, tridecyl, tetradecyl, hexadecyl, octadecyl, docosyl, tricosyl and heptacosyl radicals, aryl, e.g. phenyl, naphthyl, which are substituted at least once by an alkyl radical of at least 4 carbon atoms, e.g. butyl, amyl, hexyl, octyl, decyl, dodecyl, etc. or an isocyclic hydrocarbon radical which is substituted at least once by a hydrocarbon radical of at least 4 carbon atoms, i.e. 4 to 12 carbon atoms, $R_1$ and $R_2$ represent hydrogen or an alkyl radical of 1 to 4 carbon atoms which may belong to one and the same ring system, X represents either —O—, —CON—, —S—, —NH—, or —COO—, and $n$ represents a whole number from 5 to 20.

All of the nonionic surfactants characterized by the above general formula are well known to the art and fully described in U.S. Patents 1,970,578; 2,213,477; 2,519,013, etc. including those disclosed in patent application Serial No. 466,241 of Geoffrey R. Ward, filed November 1, 1954, for "Oxyethylenated Phenolic Alkylates, as Textile Finishing Agents," now abandoned, the disclosures and teachings of said patents and application are incorporated herein by reference thereto.

In preparing the non-ionic gel compositions, any one of the N-substituted-γ-hydroxy carboxylic acid amides is simply mixed with the liquid non-ionic surfactant and heated to approximately 60° C.–90° C. to effect solution, and then allowing the mixture to cool. The thixotropic gel results, the gelling usually taking place within 24 hours. The concentration of the N-substituted-γ-hydroxy carboxylic acid amide to employ may range from 3 to 20 by weight of the nonionic surfactant. It is to be noted that the proportions of the thickening agent are not critical, since any amount to be employed will depend upon the nature of the liquid non-ionic surfactant. Some surfactants of this type require very little, i.e. as little as 3% by weight, whereas others may require 10 to 12% by weight and others may require as much as 20% by weight of gelling or thickening agent. Accordingly, the actual concentration to be employed for any particular liquid non-ionic surfactant can be readily determined by simple routine spot experiments.

The thickened non-ionic surfactant compositions prepared in accordance with the present invention have the advantage of being thixotropic gels before working and are thus extremely valuable compositions of diverse commercial interest and many uses. The most conspicuous property of these new products is their great activity at surfaces and interfaces which promotes their use in a large field of the technical arts. For instance, they can be used as wetting, frothing, or washing agents in the treating and processing of textiles; for converting liquid or solid substances which per se are insoluble in water (such as hydrocarbons, higher alcohols, oils, fats, waxes, and resins) into creamy emulsions, clear solutions or fine, stable dispersions; for carbonizing; for dyeing; for the pasting of dyestuffs; for fulling, sizing, impregnating nd bleaching treatments; as cleansing agents in hard water; in tanning and mordanting processes; for dyeing acetate with insoluble dyestuffs; for the preparation of dyestuffs in finely divided form; for producing foam for fire extinguishers; as a means for improving the absorptive power of fibrous bodies; and as an aid in softening baths for hides and skins.

In addition, the non-ionic gel compositions are valuable emulsifiers for numerous insecticides, such as: DDT (2,2-bis(p-chlorophenyl)-1,1,1 - trichloroethane); 2–4–D (2,4-dichlorophenoxyacetic acid); 2–4–5–T (2,4,5-trichlorophenoxyacetic acid); Toxaphene (chlorinated camphene (67–69% Cl); Chlordane (contains 60% of 1,2,4,5,6,7,8,8-octachloro - 4,7-methano - 3a,4,7,7a-tetrahydroindane); nicotine sulfate (1-methyl-2-β-pyridyl-pyrrolidine sulfate); Dieldrin (contains 85% of 1,2,3,4, 10,10-hexachloro-6,7-epoxy - 1,4,4a,5,6,7,8,8a-octahydro-1,4,5,8-dimethanonaphthalene); Lindane (1,2,3,4,5,6-hexachlorocyclohexane (99% gamma isomer); B.H.C. (mixed isomers of 1,2,3,4,5,6-hexachlorocyclohexane); heptachlor (composition unknown—made by Velsicol Corp.); I.P.C. (isopropyl N-phenyl carbamate); Chloro I.P.C. (isopropyl-N-(3-chlorophenyl)carbamate); methoxychlor (1,1,1 - trichloro - 2,2 - bis(p-methoxyphenyl)-ethane); Aldrin (95% 1,2,3,4,10,10-hexachloro-1,4,4a,5, 8,8a - hexahydro - 1,4,5,8 - dimethanonaphthalene); parathion (O,O-diethyl-O-p-nitrophenylthiophosphate) or various dormant or mineral oil sprays containing one or a mixture of these insecticides. In addition, the non-ionic gelled surfactant compositions are particularly useful as dispersants for pesticidal powders composed of one or more of these insecticides.

The non-ionic surfactant gel compositions are valuable as additives to petroleum products, fuel oils, lubricating oils, greases and as oil well drilling additives. They are also useful in oil recovery from oil-bearing strata.

Other valuable uses are in the cleaning of metals, cleaning compositions, dry cleaning compositions, additives for rubber latices; foam inhibitors for synthetic rubber latex emulsions; froth flotation agents, additives for road building materials; as air entraining agents for concrete or cement; additives to asphalt compositions, plasticizers and modifiers for vinyl plastics, alkyd resins, phenolformaldehyde resins, and other types of polymeric-type plastic materials; for incorporation into adhesives, paint, linoleum; for use in bonding agents used in various insulating and building materials; as refining aids in wood digesters to prepare pulp; as additives to pulp slurries in beating operations to prevent foaming and also to aid the beating operation in paper-making; as aids in the preparation of viscose dope.

The non-ionic surfactant gel compositions are especially useful as emulsifiers for emulsion polymerization, as mercerizing assistants, wetting agents, rewetting agents, dispersing agents, detergents, penetrating agents, softening agents, lime soaps dispersants, dishwashing agents, anti-static agents, disinfectants, insecticides, mothproofing agents, bacteriocides, fungicides and biocides.

Of particular interest is their utility as anti-fogging agents for use on glass and other surfaces where the accumulation of an aqueous fog is detrimental. They are useful in the rayon industry as additives to the dope or to the spinning bath and as aids in clarifying viscose rayon. They are of value in hydraulic fluids to improve viscosity characteristics.

The non-ionic surfactant gel compositions are especially useful in breaking petroleum emulsions. They may be used to break emulsions of crude petroleum and salt water as obtained from oil wells, or to prevent water-in-oil emulsions resulting from acidization of oil wells by introducing the agent into the well, or to break or prevent emulsions which would result from a water flooding process for recovering oil from oil-bearing strata. They may also be used to break emulsions encountered in a petroleum refining process.

They are useful as corrosion inhibitors, as rust inhibitors, in the protection of metals especially ferrous metals, in acid pickling baths, in acid cleaning compositions, and in electroplating baths. Other valuable uses are as solvents or in solvent compositions, as cleaning agents for paint brushes, as additives for paints, lacquers, and varnishes; as lubricants, as greases and stuffing agents.

These products are valuable in the preparation of skin creams, lotions, salves and other cosmetic preparations such as home hair-wave sets, shampoos, toothpastes, etc. They may also be of value in food products as foaming agents, emulsifying agents, and softening agents. They may be used as aids in conditioning of soil; as aids in the grinding, milling or cutting of metals either in aqueous solution, emulsions or in oils; as aids in the fixing of dyes to leather and natural or synthetic fibers; as aids in level dyeing of fibers; as aids in stimulating plant growth; as an additive to cement to improve the strength of the resulting concrete or to improve its hardening time or its resistance to freezing and thawing or scaling; as curing aids and penetrants for use in fertilizer.

The thickening or gelling agent may be the product of an alkanolamine with any one of the aforementioned N-substituted-γ-hydroxycarboxylic acid amides and mixed with a liquid non-ionic surfactant. The resulting gel composition functions as a very good emulsifying agent when it is desired to emulsify the gel in water. Such a composition also seems to result in cosolubilization between the various components of the gelled system and may also cosolubilize extraneous material not necessarily essential to the gelled system.

The various N-substituted-γ-hydroxy carboxylic acid amides characterized by the general formula and those which are further treated with an alkylolamine and then mixed with a non-ionic surfactant are admirably suitable for use as textile auxiliaries, for such systems are convenient, they are easily prepared, they are thickened and accordingly render the textile more controllable. They are thixotropic and assist the processing of the material. They are also lubricants and assist the process in this manner. They are antistatic, are easily removed when there is no further need for their functions, and are not conducive to corrosion. There are various other functions which these compositions perform in the textile field. However, it is not to be construed that the compositions herein disclosed are restricted to textile applications since many other applications will occur, as in the metal industry, various other process industries, in the recovery of natural resources, etc., and others too numerous to mention some of which will be perceived by those skilled in the art.

The exact nature of the gelation effect is not fully understood at the present time. While it could be imagined that an association of molecules occurs, perhaps through hydrogen bonding, no evidence has been obtained to indicate that this is definitely the case. Similarly, the mutual solubilizing effects observed have not been explained in a definite manner and any remarks concerning colloids, micells, etc. would be pure conjecture to be proved or disproved by later experimentation.

With respect to the improved gelling effect, one hesitates to employ the term "synergism" due to the fact that one has not the assurance that the ethoxylated material enters into the gelation; it may merely assist the gelling agent to exercise its effect more efficiently, an effect which might otherwise be achieved were the optimum gelling conditions known. That there is a relationship, however, may be deduced from that, of themselves the ethoxylated materials usually do not dissolve, for example, in hydrocarbons and do not gel hydrocarbons; in the presence of the gelling agents here employed, the ethoxylated materials are taken up in hydrocarbon and the result is thixotropically gelled.

In order to disclose the invention in greater detail, the following examples are given. It is to be clearly understood that these examples are merely illustrative and are not intended to limit the scope of the invention claimed. All parts given are percent by weight.

*Example I*

| | Percent |
|---|---|
| The product of illustration (14) | 5 |
| Non-ionic surfactant obtained by condensing 1 mole of nonylphenol with 9 moles of ethylene oxide | 95 |

The product of illustration (14) and the non-ionic surfactant were heated together to approximately 60° C. to effect solution. The molten mass was allowed to cool with slow agitation until it formed a semi-solid mass.

The product was dispensed from a collapsible tube and mixed in the proper amount with stock insecticide and water to produce an emulsion useful for spraying.

*Example II*

1 mole of the product of illustration (14) and 1 mole of diethanolamine were heated together for 1 hour at 150° C. with stirring and the mixture allowed to cool to room temperature. Within 24 hours a smooth semi-solid mass was obtained.

It is to be noted that instead of diethanolamine other alkanolamines such as triethanolamine, ethylethanolamine, butanolamine, dialkanolamine, trialkanolalkylamine, etc. may be employed to yield thixotropic gels which may be used in any of the applications hereinbefore described.

*Example III*

| | Percent |
|---|---|
| The product of Example II | 9 |
| Nonylphenoxypolyoxyethylene ethanol obtained by condensing 1 mole of nonyl phenol with 9 moles of ethylene oxide | 91 |

The product of Example II and the non-ionic surfactant were heated together to 60° C. to effect solution, The molten mass was allowed to cool with slow agitation until it formed a smooth semi-solid mass. The mass was then allowed to cool to room temperature.

The resulting product was used in the same manner as in Example I.

Example IV

Example I was repeated with the exception that the product of illustration (14) was increased by 2½% and 95% of the non-ionic surface active agent was replaced by 92.5% of tridecylpolyoxyethylene ethanol obtained by condensing 1 mole of tridecyl alcohol with 7 moles of ethylene oxide. After heating to 60° C. to effect solution, the molten mass was allowed to cool with slow agitation until it formed a smooth semi-solid mass.

The resulting product was dispensed from collapsible containers directly onto textile materials prior to cleaning as a spotting agent.

Example V

| | Percent |
|---|---|
| The product of illustration (14) | 94 |
| Non-ionic surface active agent, tridecylpolyoxy ethylene ethanol, obtained by condensing 1 mole of the tridecyl alcohol with 9 moles of ethylene oxide | 6 |

The product of illustration (14) and the non-ionic surfactant were heated together to 60° C. to effect solution. The mass was then allowed to cool to room temperature until it formed a smooth semi-solid mass.

The product was used in the same manner as in Example IV.

Example VI

| | Percent |
|---|---|
| The product of illustration (7) | 15 |
| Non-ionic surfactant obtained by condensing 1 mole of nonylphenol with 9 moles of ethylene oxide | 85 |

The product of illustration (7) and the non-ionic surfactant were heated to 60° C. to effect solution. The mass was then allowed to cool to room temperature until it formed a smooth semi-solid mass.

The product was used as a non-drip paint remover. It was brushed on vertical surfaces without consequent drip or run-off.

Example VII

The product of Example II, hereinafter referred to as additive composition of Example II was compounded at 2% concentration with mineral lubricating oil (540 centipoises at 25° C.) the mixture heated to 375° C. and then allowed to cool to room temperature. Upon cooling, the system although somewhat gelled, was noted to exist in two phases. The same results were obtained when the additive product of Example II was replaced by the products of illustrations (1) to (14) inclusive.

Various ratios of the additive product of Example II with a commercially available product of nonylphenol ethoxylated with 9–10 moles of ethylene oxide were incorporated into mineral lubricating oil having a viscosity of 540 centipoises at 25° C. at 3% total additive concentration. The ratios varied from 20 to 80% for each. The gels resulting after the systems had been heated to 90° C. and cooled were homogeneous and range from clear to very slightly cloudy. In the case of the products of illustrations (1) to (14), containing 75% by weight of nonylphenol ethoxylated with 9 moles of ethylene oxide, the resulting gel was clear.

This example clearly illustrates the improved gelation of this type of mineral oil. It also illustrates the co-solubilizing effect. In other words, neither additive was soluble alone in the oil, each producing two phases with the oil together with clear gels resulted in most cases and no separated phases were evident. Other ethoxylated phenols which have been successful in this operation include nonylphenol ethoxylated with 4 to 11 moles of ethylene oxide. Similar results were obtained with non-ionics obtained by ethoxylation of pentadecylphenols, various fatty acids ranging from 12 to 18 carbon atoms in chain length, either saturated or unsaturated, various alcohols of the same diversity, and each of these ethoxylated in the range of 5 to 20 moles of ethylene oxide to 1 mole of the base material, i.e. pentadecylphenol, fatty acid, etc.

Example VIII

The non-ionic surfactants thickened with gelling agents of illustrations (1) to (14) and the additive product of Example II are efficacious in liquid mineral, vegetable, animal and synthetic oils such as corn oil, sperm whale oil, linseed oil, silicone oil and many others.

The various ethoxylated materials referred to in Example VII perform the additional function of emulsifiers when the three component system gelling agent, auxiliaries and liquid oil is mixed with water. As illustrative of the unusual results, the following composition yielded a stable emulsion:

| | Percent |
|---|---|
| The additive product of Example II | 0.075 |
| Non-ionic surfactant obtained by condensing 1 mole of fatty acids derived from soybean oil with 5 moles of ethylene oxide | 0.075 |
| Light mineral oil sp. gr. 60° F. 0.84, Saybolt viscosity 100° F. 70 (15½ cps. 25° C.), flash point 355° F., pour point 30° F | 4.85 |
| Water | 95 |

The foregoing ingredients were compounded in the order given and warmed to 75° C. to effect the desired homogeneity. The resulting composition may be applied to fibers, yarns, etc., on an approximately equal weight basis. The emulsion will evenly penetrate the yarns and evenly coat the surfaces, and when the water is removed through evaporation, there will remain the coating of textile auxiliary which will assist in manufacturing through its thixotropy, lubrication, antistatic, etc. nature as previously described.

Example IX

Example VIII was repeated with the exception that an equivalent amount of the light mineral oil was replaced by a heavier mineral oil having a viscosity of 540 cps. at 25° C. When applied to fibers, yarns, etc., the results were the same.

Example X

Example VIII was repeated with the exception that the composition therein was replaced by an equivalent amount of the smooth semi-solid mass of illustration (4). The same results were obtained.

Example XI

Example VIII was again repeated with the exception that the composition therein was replaced by an equivalent amount of the composition of Example III. The same results were obtained.

Example XII

Example VIII was repeated with the exception that the composition therein was replaced by an equivalent amount of the smooth semi-solid mass of illustration (6). The same results were obtained.

Example XIII

Example VIII was again repeated with the exception that the composition therein was replaced by an equivalent amount of the smooth semi-solid mass of illustration (5). The same results were obtained.

Example XIV

The compositions of Example VII were well worked and then tested with the Brookfield synchroelectric viscosimeter. The results obtained while using both a light and mineral oil are as follows:

| Composition of Additive | | Viscosity, cps., 3% addition in light mineral oil | Viscosity, centipoises (3% addition) in heavier mineral oil— from Example VII |
|---|---|---|---|
| Percentage of Nonionic Surfactant Described in Example I | Percentage of Additive Composition of Example II | | |
| 0 | 0 | 15 | 540 |
| 80 | 20 | 680 | 2,800 |
| 75 | 25 | 900 | 2,600 |
| 50 | 50 | 1,080 | 7,050 |
| 25 | 75 | 1,940 | 8,850 |
| 20 | 80 | 1,920 | 14,100 |
| 0 | 100 | 1,700 | [1] 2,000 |

[1] 0.5% gave 2000 cps. 2% also gave 2000 cps., both contained undissolved material; evidently this was the maximum attainable under the conditions.

The foregoing example is illustrative of the amount of additive and the results obtained. From the data presented, it becomes clearly apparent that lubricants of any desired consistency may be obtained by varying the starting material, the amount and ratio of ingredients of the thickening or gelling agent.

We claim:
1. A thixotropic composition comprising 80–97% by weight of a liquid nonionic surface active agent having the following general formula:

$$R_3X[CH-CHO]_n-H$$
$$\quad\quad\;\; |\quad\; |$$
$$\quad\quad\;\; R_1\; R_2$$

wherein $R_3$ represents a member selected from the class consisting of an alkyl radical of 8 to 27 carbon atoms, phenyl and naphthyl radicals substituted at least once by an alkyl radical of at least 4 carbon atoms, $R_1$ and $R_2$ represent a member selected from the class consisting of hydrogen and an alkyl radical of 1 to 4 carbon atoms, $n$ represents a whole number ranging from 5 to 20, and X represents a member selected from the class consisting of —O—, —CON—, —S—, —NH— and —COO—, and 3–20% by weight of at least one gelling agent having the following general formula:

$$\text{R-CH-CH}_2\text{CH}_2\text{CONHCH}\overset{R'}{\underset{R''}{\diagdown}}$$
$$\;\;\;\;|$$
$$\;\;\;\text{OH}$$

wherein R represents a member selected from the class consisting of hydrogen and methyl group, R' represents an organic radical selected from the group consisting of alkyl, alkylene and aralkyl radicals containing from 10 to 30 carbon atoms, and R" represents a member selected from the class consisting of hydrogen and an alkyl group of from 1 to 18 carbon atoms, the total number of carbon atoms constituting the groups in both R' and R" being at least 10 and not more than 48 carbon atoms.

2. A thixotropic composition according to claim 1 wherein the gelling agent comprises the reaction product of 1 mole of γ-butyrolactone and 1 mole of a mixture of amines having the following composition:

| | Percent |
|---|---|
| Octylamine | 8 |
| Decylamine | 9 |
| Dodecylamine | 47 |
| Tetradecylamine | 18 |
| Hexadecylamine | 8 |
| Octadecylamine | 5 |
| Octadecenylamine | 5 |

3. A thixotropic composition according to claim 1 wherein the gelling agent comprises the reaction product of 1 mole of γ-butyrolactone and 1 mole of a mixture of amines having the following composition:

| | Percent |
|---|---|
| Octadecenylamine | 15 |
| Octadecadienylamine | 15 |
| Abietylamine | 70 |

4. A thixotropic composition according to claim 1 wherein the gelling agent comprises the reaction product of 1 mole of γ-butyrolactone and 1 mole of a mixture of amines having the following composition:

| | Percent |
|---|---|
| Octadecenylamine | 1 |
| Tetradecylamine | 9 |
| Dodecylamine | 90 |

5. A thixotropic composition according to claim 1 wherein the gelling agent comprises the reaction product of 1 mole of γ-butyrolactone and 1 mole of a mixture of amines having the following composition:

| | Percent |
|---|---|
| Hexadecylamine | 10 |
| Octadecylamine | 10 |
| Octadecenylamine | 35 |
| Octadecadienylamine | 45 |

6. A thixotropic composition according to claim 1 wherein the gelling agent comprises the reaction product of 1 mole of γ-butyrolactone and 1 mole of octadecylamine.

7. The process of preparing a thixotropic composition which consists of heating a mixture comprising 80–97% by weight of a liquid non-ionic surface active agent having the following general formula:

$$R_3X[CH-CHO]_n-H$$
$$\quad\quad\;\; |\quad\; |$$
$$\quad\quad\;\; R_1\; R_2$$

wherein $R_3$ represents a member selected from the class consisting of an alkyl radical of 8 to 27 carbon atoms, phenyl and naphthyl radicals substituted at least once by an alkyl radical of at least 4 carbon atoms, $R_1$ and $R_2$ represent a member selected from the class consisting of hydrogen and an alkyl radical of 1 to 4 carbon atoms, $n$ represents a whole number ranging from 5 to 20, and X represents a member selected from the class consisting of —O—, —CON—, —S—, —NH— and —COO—, and 3–20% by weight of at least one gelling agent having the following general formula:

$$\text{R-CH-CH}_2\text{CH}_2\text{CONHCH}\overset{R'}{\underset{R''}{\diagdown}}$$
$$\;\;\;\;|$$
$$\;\;\;\text{OH}$$

wherein R represents a member selected from the class consisting of hydrogen and methyl group, R' represents an organic radical selected from the group consisting of alkyl, alkylene and aralkyl radicals containing from 10 to 30 carbon atoms, and R" represents a member selected from the class consisting of hydrogen and an alkyl group of from 1 to 18 carbon atoms, the total number of carbon atoms constituting the groups in both R' and R" being at least 10 and not more than 48 carbon atoms, to a temperature of 60°–90° C. to effect solution and allowing the mixture to cool to a thixotropic composition.

8. The process according to claim 7 wherein the gelling agent comprises the reaction product of 1 mole of γ-butyrolactone and 1 mole of a mixture of amines having the following composition:

| | Percent |
|---|---|
| Octylamine | 8 |
| Decylamine | 9 |
| Dodecylamine | 47 |
| Tetradecylamine | 18 |
| Hexadecylamine | 8 |
| Octadecylamine | 5 |
| Octadecenylamine | 5 |

9. The process according to claim 7 wherein the gelling agent comprises the reaction product of 1 mole of γ-butyrolactone and 1 mole of a mixture of amines having the following composition:

| | Percent |
|---|---|
| Octadecenylamine | 15 |
| Octadecadienylamine | 15 |
| Abietylamine | 70 |

10. The process according to claim 7 wherein the gelling agent comprises the reaction product of 1 mole of γ-butyrolactone and 1 mole of a mixture of amines having the following composition:

| | Percent |
|---|---|
| Octadecenylamine | 1 |
| Tetradecylamine | 9 |
| Dodecylamine | 90 |

11. The process according to claim 7 wherein the gelling agent comprises the reaction product of 1 mole of γ-butyrolactone and 1 mole of a mixture of amines having the following composition:

| | Percent |
|---|---|
| Hexadecylamine | 10 |
| Octadecylamine | 10 |
| Octadecenylamine | 35 |
| Octadecadienylamine | 45 |

12. The process according to claim 7 wherein the gelling agent comprises the reaction product of 1 mole of γ-butyrolactone and 1 mole of octadecylamine.

References Cited in the file of this patent

UNITED STATES PATENTS

| 1,659,149 | Nill | Feb. 14, 1928 |

FOREIGN PATENTS

| 697,315 | Great Britain | Sept. 23, 1953 |